United States Patent
Floyd

(10) Patent No.: US 6,460,593 B1
(45) Date of Patent: Oct. 8, 2002

(54) ADJUSTABLE-WIDTH ROLLER SHADE CONFIGURED TO MAINTAIN ORTHOGONAL TRACKING AT ALL AVAILABLE WIDTHS

(76) Inventor: James C. Floyd, 539 Hearth Pl., Lawrenceville, GA (US) 30043

( * ) Notice: Subject to any disclaimer, the term of this patent is extended or adjusted under 35 U.S.C. 154(b) by 0 days.

(21) Appl. No.: 10/075,752

(22) Filed: Feb. 14, 2002

Related U.S. Application Data

(63) Continuation of application No. 09/376,891, filed on Aug. 18, 1999.

(51) Int. Cl.[7] ................................................. B60J 1/20
(52) U.S. Cl. .................. 160/570.22; 160/250; 160/263; 160/323.1; 296/97.7; 296/97.9
(58) Field of Search ................................ 160/231, 250, 160/263, 323, 370.22; 296/97.7, 97.8, 98, 136

(56) References Cited

U.S. PATENT DOCUMENTS

| | | | | |
|---|---|---|---|---|
| 1,042,491 A | * | 10/1912 | Smith ...................... | 160/250 X |
| 1,164,385 A | * | 12/1915 | Neupauer ............... | 160/250 X |
| 2,498,094 A | * | 2/1950 | Plaum ........................ | 160/250 |
| 3,203,468 A | * | 8/1965 | Gossling et al. ............ | 160/250 |
| 3,373,464 A | * | 3/1968 | Ausnit ......................... | 24/201 |
| 3,789,904 A | * | 2/1974 | Takazawa ............... | 160/250 X |
| 4,006,770 A | * | 2/1977 | Ferguson ................... | 160/263 |
| 4,102,383 A | * | 7/1978 | Miller ......................... | 160/263 |
| 4,171,845 A | * | 10/1979 | Hirsch ...................... | 296/97 C |
| 4,344,474 A | * | 8/1982 | Berman .................. | 160/121 R |
| 4,438,799 A | * | 3/1984 | Comeau .................... | 160/263 |
| 4,619,305 A | * | 10/1986 | Comeau .................... | 160/263 |
| 4,898,224 A | * | 2/1990 | Woodworth ............... | 160/310 |
| 5,195,799 A | * | 3/1993 | Gotz et al. ............... | 296/180.1 |
| 5,647,421 A | * | 7/1997 | Hoffman et al. ........... | 160/120 |
| 5,881,792 A | * | 3/1999 | Cheng ................ | 160/323.1 X |

* cited by examiner

*Primary Examiner*—Bruce A. Lev
(74) *Attorney, Agent, or Firm*—Michael J. Mehrman; Gardner Groff & Mehrman P.C.

(57) ABSTRACT

An adjustable-width spring-operated roller shade that maintains proper orthogonal tracking at all available widths within the shade's range of width adjustment. The adjustable-width roller shade utilizes two overlapping window shades and a telescoping roller to provide a shade that is repeatedly width-adjustable within its original range of width adjustment. To keep the shade sufficiently perpendicular to the roller as the shade winds onto the roller, orthogonal tracking spacers, such as continuous, pliable strips constructed from the same material as the shades, are attached to non-overlapped portions of the shade material to compensate for the extra layers of material existing at the overlapped portion of the shades. Thus, the roller shade maintains proper orthogonal tracking of the shade at all available widths within the shade's range of width adjustment.

29 Claims, 5 Drawing Sheets

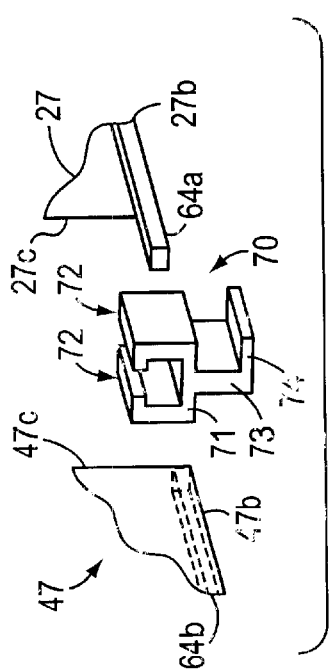
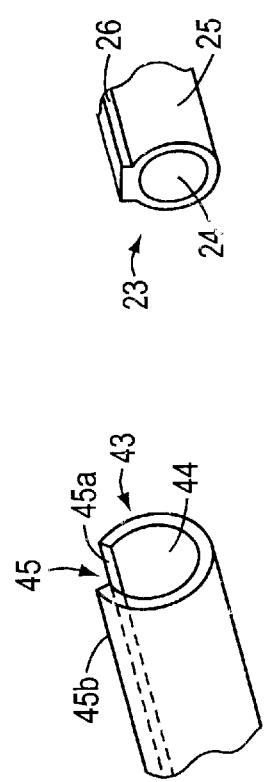
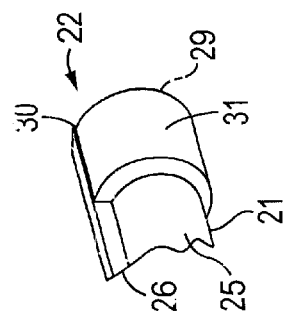
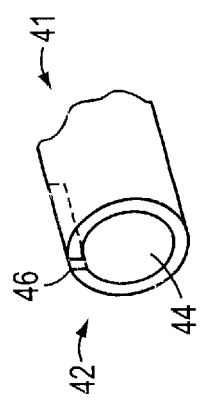
FIG. 6
FIG. 8
FIG. 5
FIG. 7
FIG. 4

ADJUSTABLE-WIDTH ROLLER SHADE CONFIGURED TO MAINTAIN ORTHOGONAL TRACKING AT ALL AVAILABLE WIDTHS

REFERENCE TO RELATED APPLICATION

This application claims the benefit of priority to commonly owned U.S. patent application Ser. No. 09/376,891, filed Aug. 18, 1999, entitled "Horizontally Mounted, Retractable Width Adjustable Window Shade."

TECHNICAL FIELD

The present invention relates generally to roller window shades and, more particularly, relates to a roller shade configured to be repeatedly width adjustable and configured to maintain proper orthogonal tracking of the shade at any available width selected for the window shade.

BACKGROUND OF THE INVENTION

Roller-type retractable window shades have long been used to provide shade and privacy for the interiors of buildings and automobiles. A multitude of different window widths is a problem that has plagued the designers of these window shades. One approach to solving this problem is to construct a wide range of different fixed-width window shades, such that a different fixed-width window shade is available for every different window width. Of course, this approach to the problem results in a very large inventory of fixed-width shades, and prevents using the same window shade with windows of different width.

To avoid having to construct a different fixed-width shade for each different window width, attempts have been made to construct adjustable-width window shades. In particular, "cut-to-fit" window shades have been constructed that permit easy width modification at the site of installation. However, once cut to a desired size, these window shades can no longer be expanded to their original maximum width. Thus, these configurations only provide a partial solution to the problem. In particular, these "cut-to-fit" window shades are not truly "adjustable-width" in that they are not repeatedly width-adjustable within their original range of width adjustment. Moreover, adjustable-width roller shades, which are specifically configured for deployment in automobiles, are not commercially available at present.

It is believed that the present unavailability of truly adjustable-width widow shades results from the inability of roller shade designers to solve the problem of mounting overlapping shade sheets on a roller that telescopes to provide width adjustment. A second unsolved problem is to design a telescoping shade that maintains "proper orthogonal tracking" at all available widths within the shade's range of width adjustment. Generally, "proper orthogonal tracking" is the ability of the shade to remain sufficiently perpendicular to the roller, as the shade winds onto the roller, to prevent an unacceptable amount of movement of the shade along the roller. In other words, proper orthogonal tracking allows the shade to wind on top of itself as it winds onto the roller, in order to prevent the shade from traveling along the length of the roller, as the shade repetitively wraps around the roller. In general, partial overlapping of the shade material being wound around the roller results in a varying thickness of the shade material along the length of the roller, prevents proper orthogonal tracking and causes the shade to move along the roller with subsequent turns of the shade around the roller. When this occurs, the window shade may form a cone rather than a cylinder as it winds, and thus bind or become damaged during retraction.

Accordingly, a need exists in the art for an improved adjustable-width window shade that is repeatedly width-adjustable within its original range of width adjustment. There is a further need for an adjustable-width roller shade that is specifically configured for deployment in automobiles. And there is a further need for an adjustable-width roller shade that maintains proper orthogonal tracking within the shade's range of width adjustment.

SUMMARY OF THE INVENTION

The present invention meets the needs described above in an adjustable-width roller shade that maintains proper orthogonal tracking at all available widths within the shade's range of width adjustment. More particularly, the adjustable-width roller shade utilizes two overlapping window shades and a telescoping roller to provide a shade that is repeatedly width-adjustable within its original range of width adjustment. To keep the shade sufficiently perpendicular to the roller as the shade winds onto the roller, orthogonal tracking spacers, such as strips of pliable material attached to non-overlapped portions of the shade material, compensate for the extra layers existing at the overlapped portion of the shades. Thus, the roller shade maintains proper orthogonal tracking of the shade at all available widths within the shade's range of width adjustment.

This configuration of the window shade allows the same shade to be adjusted to fit many different windows without having to cut or otherwise permanently alter the window shade. For this reason, multiple window shades may be adjusted, as desired, and placed side-by-side to fit curving and odd-shaped windows, such as automobile windshields and rear windows. Of course, the same roller shade may be used for side windows as well. Thus, the same window shade may be easily and cost effectively deployed to fit most of the windows of every different automobile make and model on the road, without having to cut or otherwise permanently alter the window shades. It is expected that this advantage will result in a far greater deployment of automobiles window shades than prior window shades have been able to accomplish.

In addition, the outer facing surfaces of the window shades provide advertising space that is visible to the public when the shades are pulled down inside parked automobiles. Thus, making the window shades more attractive to a substantial portion of automobile owners has the associated benefit of deploying millions of square feet of advertising space. Accordingly, automobiles including these window shades, with and without advertising indicia printed on the outward facing surfaces of the shades, are considered to be within the scope of the present invention.

Generally described, the present invention is an adjustable-width roller shade including a telescoping roller assembly having an adjustable width. The telescoping roller assembly is characterized by a shade mounting system that allows free telescoping of the roller assembly. The telescoping roller assembly carries a telescoping shade assembly that varies in width in cooperation with changes in the width of the telescoping roller assembly. The telescoping shade assembly is characterized by two shades with inner portions that overlap each other by an amount that varies with the width of the telescoping shade assembly. In addition, each shade defines an outer portion located away from the overlapped inner portion of the corresponding shade. To provide proper orthogonal tracking of the shades onto the roller, the outer portion of each shade carries an orthogonal tracking spacer, such as a strip of pliable material attached along the edge of the sheet with a thickness selected to compensate for the overlapped condition of the inner portion of the corresponding shade as that shade winds around the roller assembly. The shade also includes a spring motor, which is coupled to the roller assembly that operates to store spring energy as the shades are moved from a rolled-in configuration to a rolled-out configuration. This spring motor also uses stored spring energy to move the shades from the rolled-out configuration to the rolled-in configuration.

The roller shade may also include written indicia carried on at least one of the first and second shades that is available for viewing when the shades are in a substantially rolled-out configuration. In particular, the invention may include an automobile having a front windshield of substantial width and carrying multiple roller shades positioned in side-by-side relation across the width of the front windshield. In addition, the invention may include an automobile having a rear window of substantial width and carrying multiple roller shade positioned in side-by-side relation across the width of the rear window.

More specifically described, the telescoping roller assembly may include an inner roller having an outer longitudinal surface defining a cylinder with a longitudinal ridge extending radially outward from the cylinder. The telescoping roller assembly may also include an outer roller having an outer longitudinal surface defining a cylinder with a longitudinal channel cut through a substantial portion of the longitudinal extent of the outer surface. In addition, the inner roller is concentrically received within the outer roller, with the ridge positioned within the channel, to form a telescoping roller assembly of adjustable width. Typically, the first shade is attached to the ridge of the inner roller, and the second shade is connected to the outer surface of the outer roller.

The roller shade may also include a telescoping outer cover housing the roller assembly and constraining the spring motor from unintended release of stored spring energy. In this case, the first and second shades pass through an opening in the cover as the shades move between a fully rolled-in configuration and a substantially rolled-out configuration.

The roller shade may also include a first rod carried by a free edge of the first shade, a second rod carried by a free edge of the second shade; and a clip for securing the first and second rods together after the roller shade has been adjusted to a desired width. In this case, roller shade may also include a hook coupled to at least one of the first and second shades, typically at the clip, for securing the shades in a substantially rolled-out configuration.

In view of the foregoing, it will be appreciated that the adjustable-width roller shade avoids the drawbacks of conventional roller shades, including those configured for "cut-to-fit" width adjustment. The specific techniques and structures employed by the invention to improve over the drawbacks of the prior roller shades and accomplish the advantages described above will become apparent from the following detailed description of the embodiments of the invention and the appended drawings and claims.

BRIEF DESCRIPTION OF THE DRAWINGS

FIG. 4 is a perspective view of the receiving end of the second roller tube.

FIG. 5 is a perspective view of the inner end of the first roller tube.

FIG. 6 is an exploded, perspective view of an attached clip assembly.

FIG. 7 is a perspective view of the cap end of the second roller tube.

FIG. 8 is a perspective view of the cap end of the first roller tube with the short collar in place.

DETAILED DESCRIPTION OF THE PREFERRED EMBODIMENTS

Figure 1:
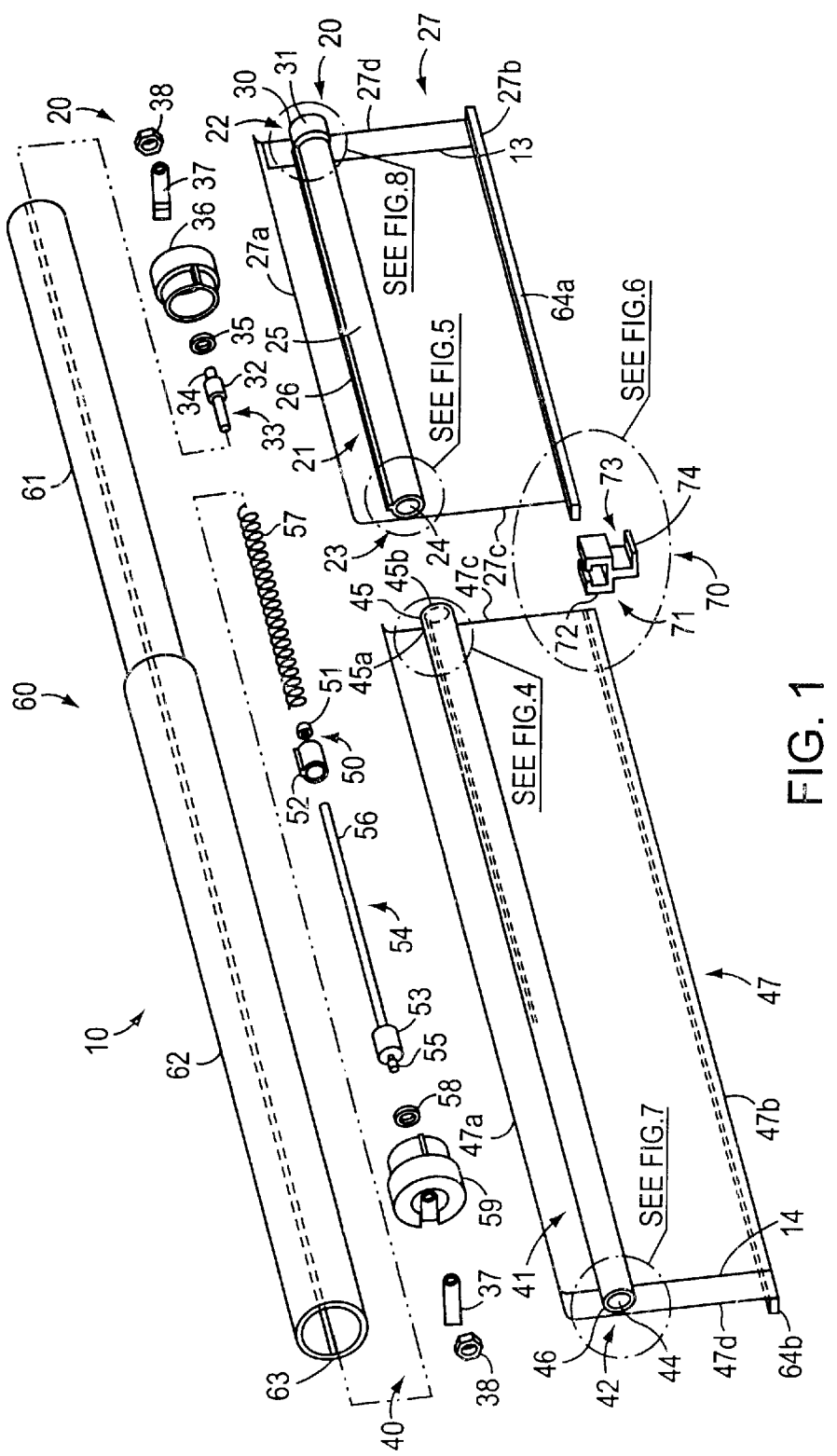
FIG. 1 is an exploded, perspective view of an adjustable-width window shade made in accordance with the present invention.

The invention may be deployed as a retractable, spring-operated, horizontally-mounted, adjustable-width window shade that can be adjusted and readjusted in width without tools, training or trimming, to provide an adjustable width window shade that maintains accurate orthogonal tracking at any allowable width. This window shade typically includes a structurally integrated cover tube that protects the shade material when not in use, provides mounting points for attachment to a window, and prevents the spring motor from unwinding prior to installation. The window shade can be advantageously shipped and stored in its relatively small fully-retracted size and, once received by the customer, it may be quickly and easily adjusted to a desired width and installed by automobile technician or end user.

It should be appreciated that, although the preferred embodiment of the invention is described as a retractable, spring-operated, horizontally mounted window shade, many other window shade configurations may be constructed using the principles of the present invention. For example, roller-to-roller shades, rather than a telescoping single-roller retractable shade, may be constructed. Similarly, hand-crank or motorized shades, rather than a spring-operated shade, may be constructed. Further, vertically or angularly mounted shades, rather than a horizontally mounted shade, may be constructed. Many other modifications and variations of the invention described herein, which will become obvious to those skilled in the art, are within the spirit and scope of the present invention.

The invention may also be used for shades or covers other than window shades. For example, the invention may be deployed in an adjustable-width projector screen, an adjustable-width fish tank screen or cover, or an adjustable-width cover for an interior room opening, such as those commonly located between a kitchen and a living room. Many other applications for the invention described herein, which will become obvious to those skilled in the art, are within the spirit and scope of the present invention.

In a preferred embodiment, the retractable, spring-operated, horizontally-mounted, adjustable-width window shade comprises a first assembly, a second assembly, a telescoping housing or cover tube, and a retaining hook. The first and second assemblies may each be based on one half of a hollow two piece roller tube designed to telescope.

The first assembly begins with that half of the telescoping roller tube with the smaller outside diameter. Attached to one side of this first roller tube, along its entire length, is a narrow, rectangular shaped ridge. This first roller tube ridge is of sufficient height, or thickness, so as to match the wall thickness of the second, larger diameter, section of the telescoping roller tube. This first assembly roller tube also has a short collar mounted on the outer tube end. This collar is slotted along its length to matingly engage the rectangular first roller tube ridge. This short collar has an outer circumference that matches the outer circumference of the larger diameter second roller tube. A pliable first sheet of shade material is attached by its leading or top horizontal edge to the top of the first roller tube ridge. This first shade sheet is as wide as the first roller tube is long. A first orthogonal tracking spacer, such as a strip of pliable material, is attached on the inner surface adjacent to the outer vertical edge of the first shade sheet. This spacer is attached a predetermined distance from the top horizontal or mounting edge and runs to the bottom horizontal edge. This first orthogonal tracking strip is as wide as the first roller tube short collar and as thick as the second shade sheet. A square stiffening rod is attached along the entire length of the bottom or trailing horizontal edge on the inner surface of the first shade sheet. This stiffener rod extends a predetermined length beyond the inner vertical edge of the first shade sheet.

The second assembly begins with that half of the telescoping roller tube with the larger outside diameter. This second roller tube has an inner circumference sufficient to matingly engage the outer diameter of the first roller tube. This second roller tube is longer than the first roller tube by a predetermined amount and has a narrow channel along one side to matingly engage the first roller tube ridge. This channel is long enough to accept that length of the first roller tube ridge not covered by the first roller tube collar. The outer circumference of the second roller tube is sufficient so that when the first roller tube is fully inserted into the second roller tube the outer surfaces of the first roller tube ridge and the first roller tube short collar are approximately flush with the outer circumference of the second roller tube. A pliable second sheet of shade material is attached by its leading edge to the second roller tube at a point in advance of the second roller tube channel. The width of this second shade sheet is equal to the second roller tube length. Another orthogonal tracking spacer is attached to the inside face of the second shade sheet along the entire outer vertical edge. This second orthogonal tracking spacer, again a pliable strip of material, is as thick as the first shade sheet and as wide as the first shade sheet orthogonal tracking strip. A second square stiffening rod is attached to the outer face of the second shade sheet along the entire length of the bottom or trailing horizontal edge.

The orthogonal tracking spacer may be a strip constructed from a relatively thin, continuous strip of the same material from which the sheet is constructed. However, it should be appreciated that the orthogonal tracking strip may be constructed from any other type of pliable material having the desired flexibility. In addition, structures other than a thin, continuous strip of pliable material may be used as the orthogonal tracking spacer. For example, one or more strips of thin, flat wire could be attached to the sheet material. Rather than being continuous, the tracking spacer may be intermittent, such as a series of patches or plastic tabs spaced along the edge of the sheet. That is, any type of structure configured to maintain acceptable orthogonal tracking by offsetting the overlapped thickness of the sheets at the center of the roller will function properly as an orthogonal tracking spacer. Nevertheless, a continuous orthogonal tracking strip attached along the outer edge of each sheet, which is constructed from a relatively thin, continuous strip of the same material from which the sheet is constructed, has been found to be the most convenient, effective and technically successful structure for implementing the orthogonal tracking spacer.

With the first roller tube inserted into the second roller tube, the second shade sheet overlaps and slidably engages the first shade sheet. During the rolling process the second shade sheet is rolled upon the inner edge of the first shade sheet and the second orthogonal tracking spacer. During winding, the orthogonal tracking spacer attached to the second shade sheet continuously adjusts the circumference of the outer end of the second roller tube to match the change in circumference occurring on the inner end of the second roller tube where the two shade sheets overlap.

The first shade sheet is rolled upon the inner end of the second roller tube and the first roller tube short collar for the first full revolution. At the beginning of the second revolution the first shade sheet begins to be wound on top of, or overlap, the first layer of the inner edge of the second shade sheet. At this point, the first shade sheet orthogonal tracking spacer begins adjusting the circumference of the first roller tube outer end to match the change in circumference occurring on the inner end of the second spin tube where the two shade sheets overlap. This allows each sheet to maintain proper orthogonal tracking as it winds onto the roller. True telescoping ability is achieved by utilizing the ridge and channel so that the sheet mounted onto the first roller tube does not interfere with the telescoping action. This roller system, in combination with the orthogonal tracking strips, establishes telescoping ability and maintains orthogonal tracking at any available width of the adjustable-width roller.

The roller and shade assembly is typically housed within a cover tube that includes two sections designed to telescope freely while resisting any rotational movement, allows free extension and retraction of the two shade sheets, prevents stored spring energy in the roller assembly from unwinding, and provides convenient attachment points for attaching the shade to a window.

Referring now to the drawings, in which like reference numerals designate corresponding parts throughout the several figures, reference is made first to FIG. 1, which shows an exploded and perspective view of an adjustable-width window shade 10. The shade 10 comprises a first assembly 20, a second assembly 40, a housing 60, and a retaining hook 70.

Referring to FIG. 1, the first assembly 20 has an elongated, cylindrically shaped first spin tube 21 having a cap end 22, a mating end 23, a first tube longitudinal axis extending between the cap and mating ends 22 and 23, a first bore 24, a first surface 25, and a ridge 26 extending outwardly from the first surface 25 and being substantially parallel to the first tube longitudinal axis. A first sheet 27 having a first upper edge 27a and a first lower edge 27b, a first inner edge 27c, and a first outer edge 27d, is mounted to the ridge 26 proximate the first upper edge 27a. Attached proximate the first outer edge 27d is an orthogonal tracking spacer 13 and proximate the first lower edge 27b is a rib 64a. Mounted to the first spin tube 21 proximate the cap end 22 is a short collar 29. The short collar 29 has a collar groove 30, which matingly engages the ridge 26, and a collar surface 31. Preferably, the short collar surface 31 is substantially flush with the outer most portion of the ridge 26. Disposed within the first bore 24 at the cap end 22 is a bushing 32 and axle 33 that is threaded at one end to facilitate attachment of a first cap 36 and a mounting bracket 37. A first rod 33 having a first threaded end 34 is inserted into and rotatably engages the first busing 32. Disposed over the first threaded end 34 is a first washer 35 and a first cap 36. The first threaded end 34 extends through and beyond the first cap 36. A mounting bracket 37 is placed onto the first threaded end 34 and secured to the first rod 33 and the first cap 36 by a nut 38.

Again referring to FIG. 1, the second assembly 40 has an elongated, cylindrically shaped second spin tube 41 having a cap end 42, a receiving end 43, a second tube longitudinal axis extending between the cap and receiving ends 42 and 43, a second bore 44 extending therethrough, and a channel 45 extending a predetermined distance substantially parallel to the second tube longitudinal axis from the receiving end 43 toward the mount end 42. The channel 45 has a first side 45a and a second side 45b. A slot 46 extends from the mount end 42 toward the receiving end 43 within the second bore 44. A second sheet 47 having an upper edge 47a, a lower edge 47b, an inner edge 47c and an outer edge 47d, is mounted proximate the upper edge 47a to the second spin tube 41 substantially parallel to the second tube longitudinal axis and adjacent the second side 45b of the channel 45. Attached proximate the outer edge 47d is an orthogonal tracking spacer 14 and proximate the lower edge 47b is a rib 64b. Disposed within the second bore 44 at the mount end 42 is a hollow drive gear 50. The drive gear 50 has both a reduced portion which forms a spring receiver 51 and a tooth 52 for engaging the slot 46. Disposed within the drive gear 50 is a hollow second bushing 53. A second rod 54 having a second threaded end 55 and a spring end 56 is inserted through the second busing and the drive gear 50 and rotatably engages the first busing 32. A spring 57 is disposed on the second rod 54. One end of the spring 57 is fixedly mounted to the spring receiver 51 of the drive gear 50, and the other end of the spring 57 is fixedly mounted to the spring end 56 of the second rod 54. Disposed over the second threaded end 55 is a second washer 58 and a second cap 59. The second threaded end 55 extends through and beyond the second cap 59. Another mounting bracket 37 is placed onto the second threaded end 55 and secured to the second rod 54 and the second cap 59 by another nut 38.

To obtain true telescoping ability, the first sheet is mounted utilizing the system of ridge and channel to allow the first tube to be inserted into the second tube without interference by the first sheet. To maintain orthogonal tracking, an adjustment may be made for the difference in the circumference of the roller assembly in the area where the sheets overlap, as compared to the non-overlapping areas, as the sheets are wound onto the roller. That is, when fully assembled, the inner edge 47c of the second sheet 47 will overlap the inner edge 27c of the first sheet 27. This establishes a concentric relationship between the two sheets being wound. To maintain proper orthogonal tracking, and offset the extra layers accumulating at the overlapping portion of the sheets, the outer edge 47d of the second sheet 47 carries an orthogonal tracking strip or spacer 14. With each revolution of the roller, this orthogonal tracking spacer 14 increases the effective circumference of the cap end 42 of the second roller tube 41 to match that increase occurring where the two sheets overlap. Because the lower edge 47b has an attached rib 64b, the sheet material is kept flat and is able to bridge the unsupported area occurring in the center of the second roller tube 41.

The first sheet 27 is wound upon the short collar 29 and the receiving end 43 of the second roller tube 41 for the first full revolution. At the beginning of the second revolution of the roller tubes 21 and 41, the overlapping area of the second sheet 47 begins to be wound under the inner edge 27c of the first sheet 27. At this point in the winding process, the orthogonal tracking spacer 13 begins to adjust the circumference of the first roller tube 21 at the cap end 22. This adjustment increases the circumference of the cap end 22 at the same rate occurring at the mating end 23 where sheets 27 and 47 overlap. This allows the sheets to maintain proper orthogonal tracking as they wind on and off the roller. Because the lower edge 27b has an attached rib 64a, the sheet material is kept flat and able to bridge the unsupported area occurring at the center of the first roller tube 21, which results in proper orthogonal tracking.

Figure 2:
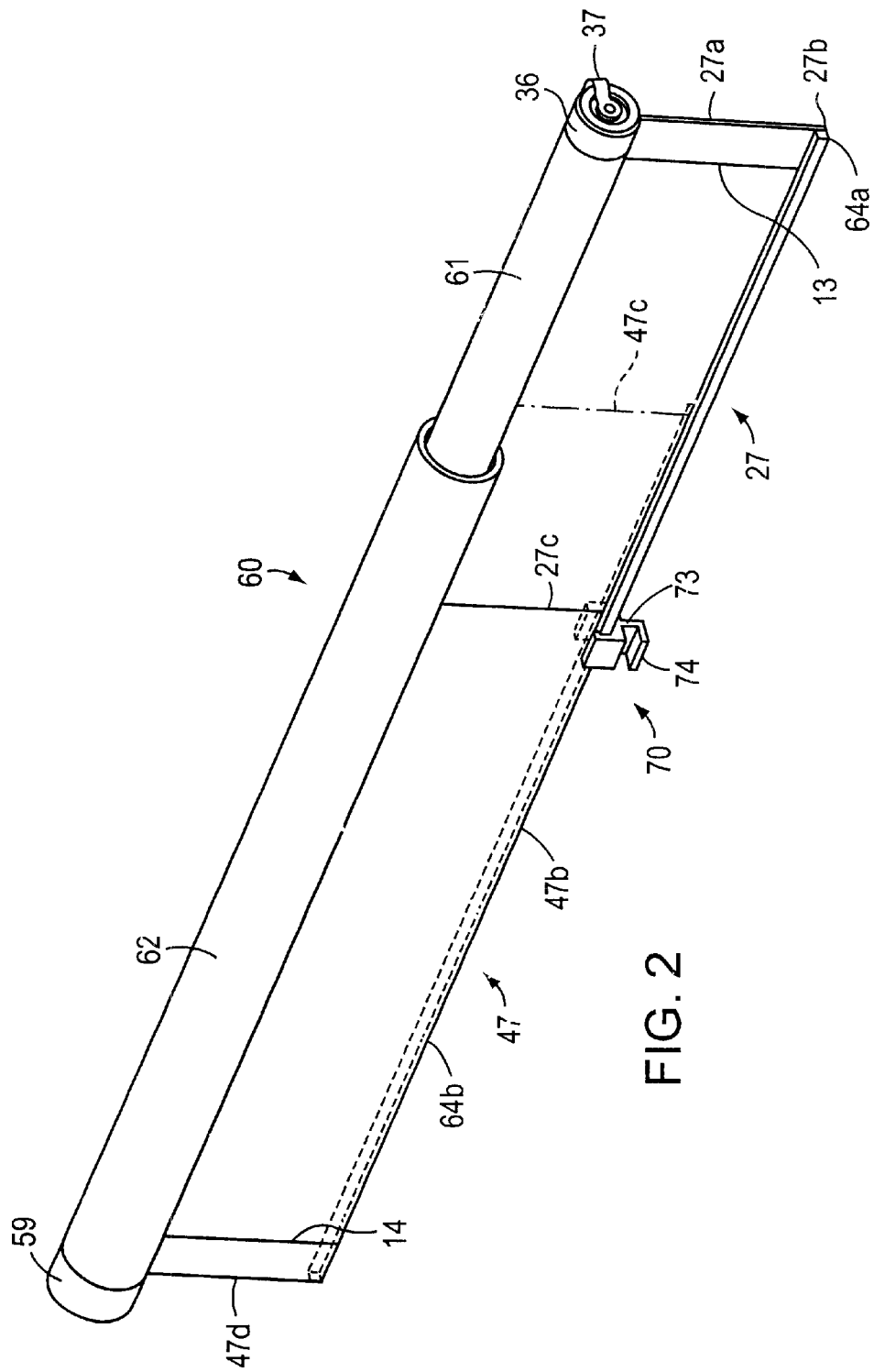
FIG. 2 is a perspective view of the adjustable-width window shade.
Figure 3:
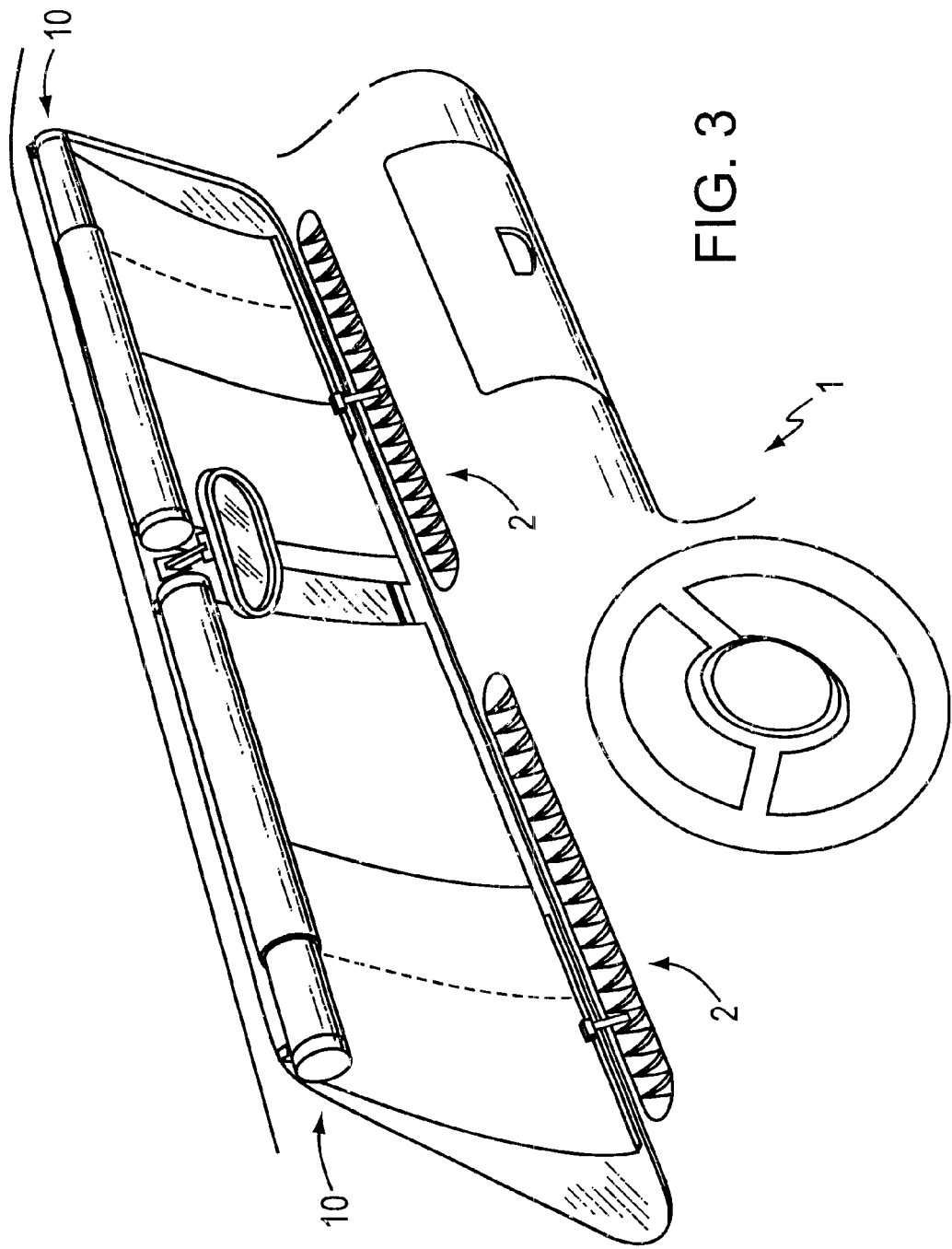
FIG. 3 is a perspective view of an automobile with its windshield protected by two adjustable-width window shades positioned side by side.

With continued reference to FIG. 1 and additionally to FIGS. 2 and 3, the housing 60 has a housing longitudinal axis extending therethrough and comprises a hollow first cover tube 61 and a hollow second cover tube 62. The first cover tube 61 has an outside diameter no larger than the inside diameter of the second cover tube 62 so that the first cover tube 61 is insertable into the second cover tube 62. As shown in the drawings, the cover tubes 61 and 62 have a cylindrical shape; however, other shapes such as square, triangular, hexagonal and the like may be utilized with the present invention and are included within the scope of the present invention. Each of the cover tubes 61 and 62 has a slot 63 which extends substantially parallel to the housing longitudinal axis, preferably the entire length thereof. The first assembly 20 is inserted into the first cover tube 61 with the first sheet 26 extending through the slot 63. The first cap 36 securely engages a respective end of the first cover tube 61. Likewise, the second assembly 40 is inserted into the second cover tube 62 with the second sheet 47 extending through the slot 63. The second cap 59 also securely engages a respective end of the second cover tube 62. The first cover tube 61 and first assembly 20 are inserted into the second cover tube 62 and second assembly 40 with the slots 63 of each being aligned, thereby having a telescoping engagement.

Additionally, as the first spin tube 21 is inserted into the second spin tube 41, the ridge 26 slidably engages the channel 45 and a rotational axis is formed between the first and second spin tubes 21 and 41. Importantly, the second sheet inner edge 47c overlaps the first sheet inner edge 27c and the outer edge 47d is supported by the orthogonal tracking spacer 14. This defines a plane for the second sheet leading edge 47a that is substantially parallel to the rotational axis and extends from the orthogonal tracking spacer 14 to the first sheet inner edge 27c at any point in the winding process.

For the leading edge of the first sheet 27, a plane substantially parallel to the rotational axis is established between the receiving end 43 of the second roller tube 41 and the short collar surface 31 for the first full revolution of the roller assembly. Because the first and second sheet inner edges 27c and 47c overlap, this plane changes at the beginning of the second revolution of the winding process. At the start of the second revolution, the circumference of the winding cylinder begins to grow twice as fast where the first and second sheets overlap as it does at the first roller tube cap end 22. To maintain a plane substantially parallel to the rotational axis for the leading edge of the first sheet 27, the orthogonal tracking spacer 13 begins to be wound under the first sheet outer edge 27d at the start of the second revolution to compensate for the inner edge 47c of the second sheet.

The width of the shade 10 can now be varied by extending or retracting the first cover tube 61 within and with respect to the second cover tube 62.

As the first and second sheets 27 and 47 are extracted or pulled from the housing 60, a standard spring motor is used to exert a biasing force to retract the first and second sheets 27 and 47 into the housing 60.

Respectively mounted substantially perpendicular to the first and second sheets 27 and 47 proximate the first and second lower ends 27b and 47b are ribs 64a and 64b. As shown in FIGS. 1, 2 and 3, the first and second sheets 27 and 47 contact one another at the first and second lower ends 27b and 47b. The ribs 64a and 64b are mounted to the sheets 27 and 47 so that each respective rib 64a and 64b projects outwardly and away from one another. Once the first and second sheets 27 and 47 have been withdrawn from the housing 60 so that the ribs 64a and 64b are a desired distance from the housing 60, the retaining hook 70 is utilized to secure the sheets 27 and 47 to an object of a vehicle 1, such as a vent 2. The retaining hook 70 has a substantially U-shape body 71 and a substantially L-shaped hook 73 extending from the body 71. Arms 72 project toward one another from the U-shaped body 71, and the L-shaped hook has a catch 74. The arms 72 removably engage the ribs 64, and the catch 74 removably engages the vent 2, or other object, of the vehicle 1. Obviously, various types of securing devices such as buttons, locks, latches, hook and loop material, stops, brakes and the like may be utilized to prevent undesired retraction of the first and second sheets 27 and 47, and are included within the scope of the present invention.

The first and second sheets 27 and 47 can be made of plastic, vinyl, cloth or any material capable of being rolled. Additionally each sheet 27 and 47 can comprise a light reflective material or have a light reflective coating or color on one or both sides.

Figure 9:
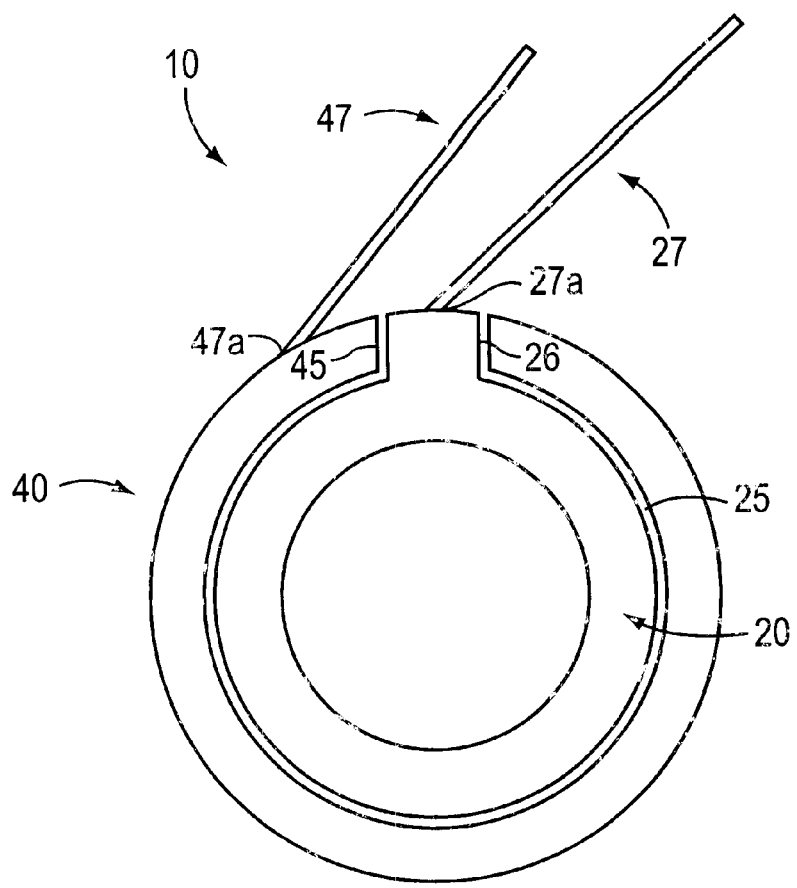
FIG. 9 is an end view of a telescoping rod assembly showing the shade sheet attachment points.

FIG. 9 is an end view of a telescoping rod assembly 10 showing the shade sheet attachment points. The rod assembly 10 includes an inner roller 20 having an outer longitudinal surface 25 defining a cylinder with a longitudinal ridge 26 carried radially outward of the cylinder. The rod assembly 10 also includes an outer tube 40 an outer longitudinal surface defining a cylinder with a longitudinal channel 45 cut through a substantial portion of the longitudinal extent of the outer surface. The inner roller 20 is concentrically received within the outer tube 40 with the ridge 26 positioned within the channel 45 to form an adjustable width telescoping roller assembly A first shade sheet 27 has an edge 27a attached to the ridge 26 of the inner roller 20 toward one end of the telescoping rod assembly 10. A second shade sheet 47 has an edge 47a attached to the outer surface of the outer roller 20 adjacent to the channel 45 and toward the opposing end of the telescoping rod assembly 10. This configuration allows the sheets 27, 47 to overlap each other at the center of the telescoping rod assembly 10 by an amount that varies with the width of the telescoping rod assembly to form an adjustable width telescoping roller shade assembly.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. It should be understood that the foregoing relates only to the exemplary embodiments of the present invention, and that numerous changes may be made therein without departing from the spirit and scope of the invention as defined by the following claims.

The invention claimed is:

1. An adjustable-width roller shade comprising:
   a telescoping roller assembly having an adjustable width;
   a telescoping shade assembly carried on the telescoping roller assembly and varying in width in cooperation with changes in the width of the telescoping roller assembly;
   the telescoping shade assembly characterized by two shades with inner portions that overlap each other by an amount that varies with the width of the telescoping shade assembly;
   each shade defining an outer portion located away from the overlapped inner portion of the corresponding shade; and
   each shade carrying an orthogonal tracking spacer for compensating for the overlapped condition of the inner portion of the corresponding shade as that shade winds around the roller assembly.

2. The roller shade of claim 1, wherein:
   each orthogonal tracking spacer comprises a strip of pliable material attached along the outer portion of a corresponding shade; and
   each strip has a thickness selected to compensate for the overlapped condition of the inner portion of the corresponding shade as that shade winds around the roller assembly.

3. The roller shade of claim 1, further comprising:
   a spring motor coupled to the roller assembly and operative to store spring energy as the shades are moved from a rolled-in configuration to a rolled-out configuration, and to use stored spring energy to move the shades from the rolled-out configuration to the rolled-in configuration.

4. The roller shade of claim 1, further comprising written indicia carried on at least one of the first and second shades and available for viewing when the shades are in a substantially rolled-out configuration.

5. The roller shade of claim 1, wherein the telescoping roller assembly comprises:
   an inner roller having an outer longitudinal surface defining a cylinder with a longitudinal ridge carried radially outward from the cylinder;
   an outer tube having an outer longitudinal surface defining a cylinder with a longitudinal channel cut through a substantial portion of the longitudinal extent of the outer surface; and
   the inner roller concentrically received within the outer tube with the ridge positioned within the channel to form an adjustable width telescoping roller assembly.

6. The roller shade of claim 5, wherein:
   the first shade is attached to the ridge of the inner roller; and
   the second shade is connected to the outer surface of the outer tube.

7. An automobile having a window of substantial width and carrying multiple roller shades as described in claim 1 positioned in side-by-side relation across the width of the window.

8. An adjustable-width roller shade comprising:
   a telescoping roller assembly having an adjustable width, including:
      an inner roller having an outer longitudinal surface defining a cylinder with a longitudinal ridge carried radially outward from the cylinder, an outer tube having an outer longitudinal surface defining a cylinder with a longitudinal channel cut through a substantial portion of the longitudinal extent of the outer surface, and the inner roller concentrically received within the outer tube with the ridge positioned within the channel to form an adjustable width telescoping roller assembly; and a telescoping shade assembly carried on the telescoping roller assembly and varying in width in cooperation with changes in the width of the telescoping roller assembly, including:
a first shade is attached to the ridge of the inner roller,
a second shade is connected to the outer surface of the outer tube, and
the first and second shades having inner portions that overlap each other by an amount that varies with the width of the telescoping shade assembly.

9. The roller shade of claim 8, further comprising:
a spring motor coupled to the roller assembly and operative to store spring energy as the shades are moved from a rolled-in configuration to a rolled-out configuration, and to use stored spring energy to move the shades from the rolled-out configuration to the rolled-in configuration.

10. The roller shade of claim 8, further comprising:
a first orthogonal tracking spacer for compensating for the overlapped condition of the inner portion of the first shade as that shade winds around the roller assembly; and
a second orthogonal tracking spacer for compensating for the overlapped condition of the inner portion of the second shade as that shade winds around the roller assembly.

11. The roller shade of claim 10, wherein:
each orthogonal tracking spacer comprises a strip of pliable material attached along the outer portion of a corresponding shade; and
each strip has a thickness selected to compensate for the overlapped condition of the inner portion of the corresponding shade as that shade winds around the roller assembly.

12. The roller shade of claim 11, further comprising written indicia carried on at least one of the first and second shades and available for viewing when the shades are in a substantially rolled-out configuration.

13. An automobile having a window of substantial width and carrying multiple roller shades as described in claim 12 positioned in side-by-side relation across the width of the window.

14. An adjustable-width roller shade comprising:
an inner roller having an outer longitudinal surface defining a cylinder with a longitudinal ridge carried radially outward from the cylinder;
an outer tube having an outer longitudinal surface defining a cylinder with a longitudinal channel cut through a substantial portion of the longitudinal extent of the outer surface;
the inner roller concentrically received within the outer tube, with the ridge positioned within the channel, to form a telescoping roller assembly of adjustable width;
a first shade connected to the longitudinal ridge of the inner roller and defining an outer portion located longitudinally away from the outer tube;
a second shade connected to the outer tube and defining an outer portion located longitudinally away from the inner roller;

the first shade having an inner portion being overlapped by an inner portion of the second shade to form a telescoping shade assembly of adjustable width carried on the telescoping roller assembly;

a first orthogonal tracking strip attached to the outer portion of the first shade and having a thickness selected to compensate for the overlapped condition of the inner portion of the first shade when winding the first shade around the roller assembly;

a second orthogonal tracking strip attached to the outer portion of the second shade and having a thickness selected to compensate for the overlapped condition of the inner portion of the second shade when winding the second shade around the roller assembly; and a spring motor coupled to the roller assembly and operative to store spring energy as the first and second shades are moved from a rolled-in configuration to a rolled-out configuration, and to use stored spring energy to move the first and second shades from the rolled-out configuration to the rolled-in configuration.

15. The roller shade of claim 14, further comprising an outer cover housing the roller assembly and constraining the spring motor from unintended release of stored spring energy.

16. The roller shade of claim 15, wherein the first and second shades pass through an opening in the cover as the shades move between a fully rolled-in configuration and a substantially rolled-out configuration.

17. The roller shade of claim 14, further comprising:
a first rod carried by a free edge of the first shade;
a second rod carried by a free edge of the second shade; and
a clip for securing the first and second rods together after the roller shade has been adjusted to a desired width.

18. The roller shade of claim 14, further comprising a hook coupled to at least one of the first and second shades for securing the shades in a substantially rolled-out configuration.

19. The roller shade of claim 14, further comprising written indicia carried on at least one of the first and second shades and available for viewing when the shades are in a substantially rolled-out configuration.

20. An automobile having a window of substantial width and carrying multiple roller shades as described in claim 19 positioned in side-by-side relation across the width of the window with the written indicia displayed for viewing by a person located on the outside of the automobile proximate to the window.

21. An adjustable-width roller shade comprising:
a telescoping roller assembly having an adjustable width;
a telescoping shade assembly carried on the telescoping roller assembly and varying in width in cooperation with changes in the width of the telescoping roller assembly;
the telescoping shade assembly characterized by two shades that have inner portions that overlap each other by an amount that varies with the width of the telescoping shade assembly;
each shade defining an outer portion located away from the overlapped inner portion of the corresponding shade;
a first orthogonal tracking strip attached to the outer portion of the first shade and having a thickness selected to compensate for the overlapped condition of the inner portion of the first shade when winding the first shade around the roller assembly; and a second orthogonal tracking strip attached to the outer portion of the second shade and having a thickness selected to compensate for the overlapped condition of the inner portion of the second shade when winding the second shade around the roller assembly.

22. The roller shade of claim 21, further comprising:

a spring motor coupled to the roller assembly and operative to store spring energy as the first and second shades are moved from a rolled-in configuration to a rolled-out configuration, and to use stored spring energy to move the first and second shades from the rolled-out configuration to the rolled-in configuration.

23. The roller shade of claim 22, further comprising:

an outer cover housing the roller assembly and constraining the spring motor from unintended release of stored spring energy and defining an opening through which the first and second shades pass when moving between a fully rolled-in configuration a substantially rolled-out configuration.

24. The roller shade of claim 23, further comprising:

a first rod carried by a free edge of the first shade;

a second rod carried by a free edge of the second shade; and a clip for securing the first and second rods together after the roller shade has been adjusted to a desired width.

25. The roller shade of claim 24, further comprising:

a hook coupled to at least one of the first and second shades for securing the shades in a substantially rolled-out configuration.

26. The roller shade of claim 25, wherein the telescoping roller assembly comprises:

an inner roller having an outer longitudinal surface defining a cylinder with a longitudinal ridge carried radially outward from the cylinder;

an outer tube having an outer longitudinal surface defining a cylinder with a longitudinal channel cut through a substantial portion of the longitudinal extent of the outer surface; and the inner roller concentrically received within the outer tube, with the ridge positioned within the channel, to form a telescoping roller assembly of adjustable width.

27. The roller shade of claim 26, wherein:

the first shade is attached to the ridge of the inner roller; and the second shade is connected to the outer surface of the outer tube.

28. The roller shade of claim 27, further comprising written indicia carried on at least one of the first and second shades and available for viewing when the shades are in a substantially rolled-out configuration.

29. An automobile having a window of substantial width and carrying multiple roller shades as described in claim 28 positioned in side-by-side relation across the width of the window with the written indicia displayed for viewing by a person located on the outside of the automobile proximate to the window.

* * * * *